Dec. 9, 1924. 1,518,802
A. L. McCAULEY
TRACTION ATTACHMENT FOR VEHICLE WHEELS
Filed Jan. 21, 1924 2 Sheets-Sheet 2

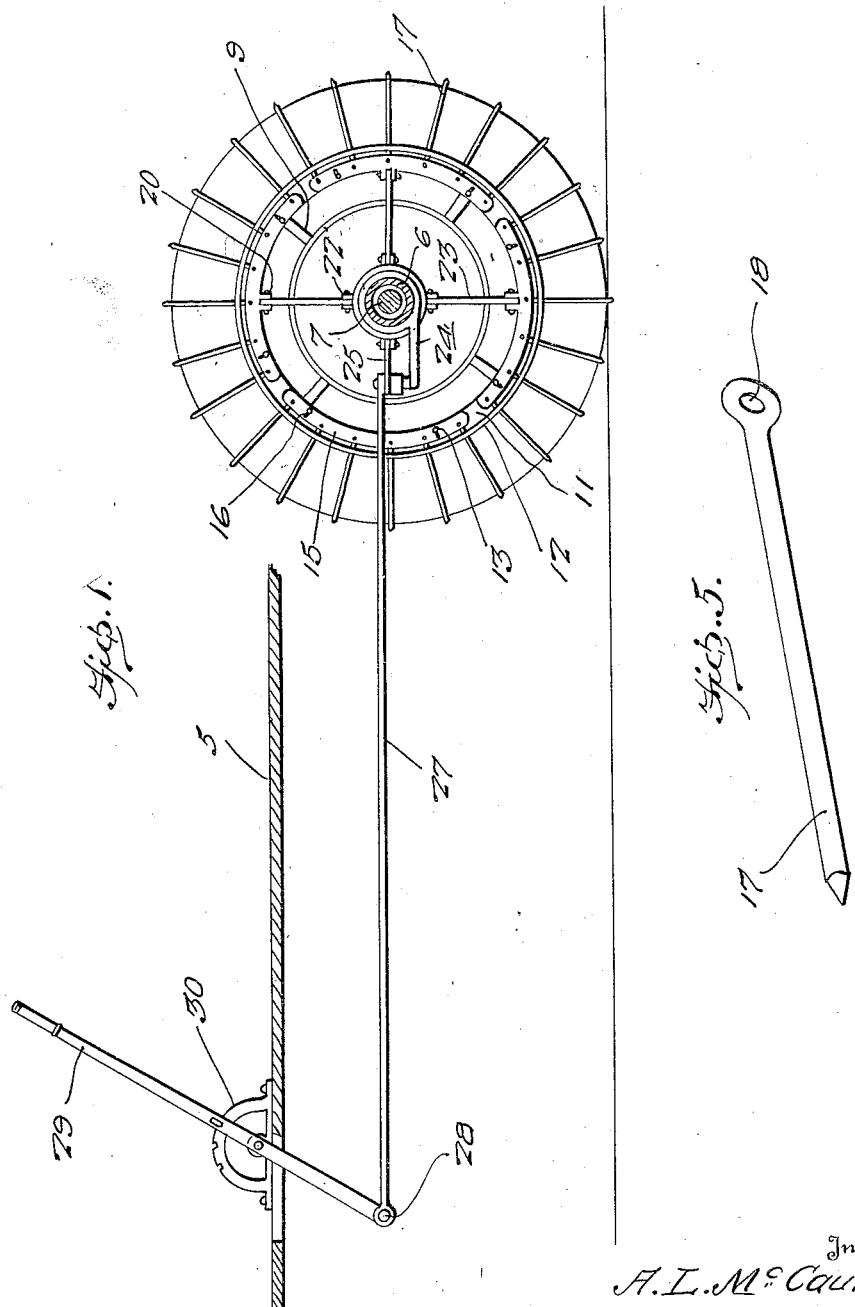

Inventor
A. L. McCauley
By Clarence A. O'Brien
Attorney

Patented Dec. 9, 1924.

1,518,802

UNITED STATES PATENT OFFICE.

ALPHONSUS L. McCAULEY, OF EXETER BORA, PENNSYLVANIA.

TRACTION ATTACHMENT FOR VEHICLE WHEELS.

Application filed January 21, 1924. Serial No. 687,567.

*To all whom it may concern:*

Be it known that I, ALPHONSUS L. Mc-CAULEY, citizen of the United States, residing at Exeter Bora, in the county of Luzerne and State of Pennsylvania, have invented certain new and useful Improvements in Traction Attachments for Vehicle Wheels, of which the following is a specification.

This invention relates to improvements in traction devices, particularly adapted for attachment to the wheels of motor vehicles.

The object of the invention is to equip the rear wheels of the vehicle with a plurality of spurs which normally have a position inwardly of the tread surfaces of the wheel tires, and which are manually movable outwardly beyond the tread surfaces or back to said normal position.

Another object is to provide improved guiding and operating means for the spur so that under favorable road conditions the spurs may be retracted or rendered inoperative and under unfavorable road conditions, the spurs may be projected for preventing slipping and skidding and insuring positive tractive effort on the part of the wheels.

A further object of the invention is to provide an attachment of the above kind that may be readily and cheaply manufactured and placed into use, and which will be characterized by durability and efficiency in operation.

Other objects will appear as the nature of the invention is better understood, and the same consists in the novel form, combination, and arrangement of parts hereinafter more fully described, shown in the accompanying drawings and claimed.

In the drawings wherein like references characters indicate corresponding parts throughout the several views:

Figure 1 is a fragmentary longitudinal sectional view of a motor vehicle equipped with a traction device constructed in accordance with the present invention.

Figure 5 is an enlarged perspective view of one of the spurs.

Figure 3:
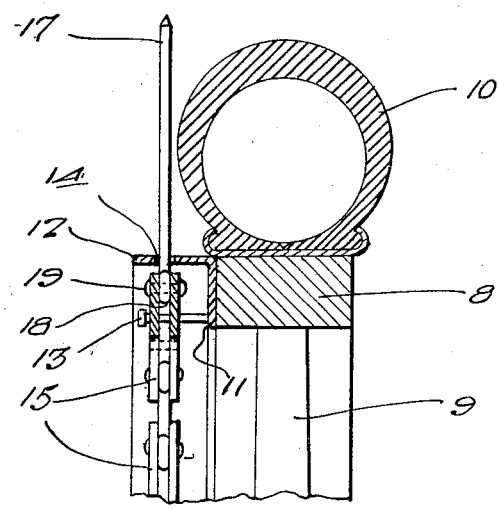
Figure 3 is a fragmentary radial sectional view through the wheel and attached parts shown in Figure 2 and drawn on a larger scale.
Figures 2, 4:
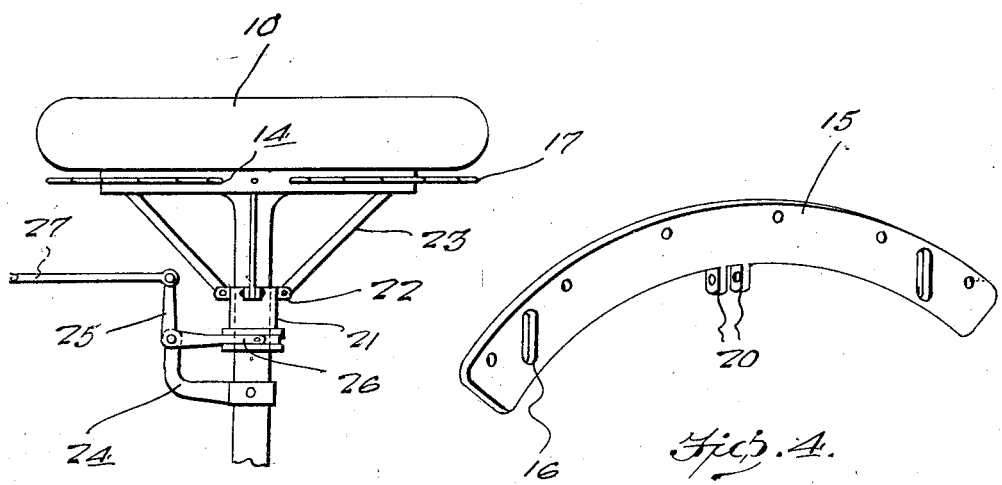
Figure 2 is a fragmentary top plan view of the rear portion of the device shown in Figure 1.
Figure 4 is a perspective view of one of the plates of one of the arcuate spur carrying shoes drawn on a larger scale.

Referring more in detail to the drawing, 5 indicates the floor of the vehicle body that is supported by the usual running gear in a well known manner, and 6 indicates the rear axle housing which encases the rear axle 7 and which is rigid with the running gear as is well known. One of the rear driven supporting wheels that is carried by the axle 7 is shown and this wheel is of the usual construction including a felly 8 carried by rigid radial spokes 9 and having the usual pneumatic tire 10 mounted thereon.

In accordance with the present invention, a ring of angular cross section is rigidly attached to the inner side of the felly 8 by bolting or the like, and this ring includes an inner radial flange 11, and integral axially extending and inwardly projecting outer flange 12. As shown more clearly in Figure 3, the radial flange 11 is provided with a plurality of axially extending or horizontal guide pins 13, that are spaced inwardly from the flange 12, while the latter flange is provided with a circular series of openings therethrough as indicated at 14. Disposed adjacent to and at the inner side of the flange 12 are a plurality of arcuate spur carrying shoes that are disposed in end to end slightly spaced relation as seen in Figure 1, these shoes each embodying a pair of arcuate plates 15, that are disposed in side by side relation and are provided with radial elongated slots 16 in the ends thereof, through which the guide pins 13 project for permitting radial movement of the shoes and guiding the same in such movement. A circular series of radial spurs 17 project through the openings 14 at one side of the tire 10 and the inner ends of these spurs are provided with eyes 18 that are disposed between the pairs of shoe plates 15. A plurality of the spurs 17 are associated with each shoe and the plates of each shoe are connected to each other by means of bolts or rivets 19 which also pivotally connect the inner ends of the spurs 17 to said shoes for swinging movement longitudinally of the vehicle. The inner ends of adjacent spurs are spaced apart slightly less than the distance of spacing between the openings 14 in the flange 12, so that the spurs will, at all times occupy an exactly radial position relative to the wheel as permitted by the pivotal mounting thereof at 19.

The inner plate of each shoe is provided with a central pair of inwardly projecting ears 20 and a collar 21 is slidably mounted upon the adjacent end portion of the rear axle housing 6 for movement transversely of the vehicle or toward and away from the adjacent wheel, which collar is provided with a circular series of lugs or ears 22 arranger in pairs. Each pair of ears of the collar 21 is connected with a pair of ears of one of the shoes by means of a transversely inclined link 23, and it will thus be seen that the collar 21 and link 22 form means for supporting the shoes in their proper position inwardly of the flange 12.

A suitable angular bracket 24 is clamped or otherwise secured upon the rear axle housing 6 inwardly of the collar 21 and pivoted upon the projecting end of this bracket 24 is a horizontal bell crank lever 25, the rear arm of which is formed to provide a shifting fork 26 operatively associated with the collar 21 so as to cause movement of the latter longitudinally of the rear axle housing 6 and at the same time permit rotation of said sleeve 21 relative to the rear axle housing and the bell crank lever 25. It is thus apparent that by operating the bell crank lever 25, the collar 21 may be shifted inwardly or away from the adjacent supporting wheel of the vehicle so as to cause the link 23 to move the shoes inwardly and thereby retract the traction spurs 17 inwardly beyond the tread surface of the tire 10. It will also be apparent that by swinging the bell crank lever in the opposite direction, the sleeve 21 may be moved toward the adjacent supporting wheel of the vehicle, so as to cause the shoes to move outwardly toward the flange 12 and thereby cause the spurs 17 to be projected outwardly beyond the tread surface of the tire 10 for engaging the road and thereby preventing slipping or skidding of the wheel.

The construction above described comprises a comparatively few number of movable parts all of which are of simple and durable form so as to not be likely to readily get out of order. The construction is also capable of being readily manufactured and assembled, as well as placed into use, at a nominal cost. For the purpose of causing swinging of the bell crank lever 25, the same may be connected to the rear end of a rod 27 that extends forwardly from the bell crank lever 25 and longitudinally of the vehicle and which is pivoted as at 28 to the lower end of a hand lever 29, which is pivotally mounted for longitudinal swinging movement, and extended upwardly through the floor 5 of the vehicle in position to be operated by the driver of the vehicle. Suitable latching means including the usual segments 30 may also be provided for maintaining the lever 29 in either of its positions.

What I claim as new is:

1. A traction attachment for vehicle wheels including a ring of angular cross section adapted to be rigidly secured against the inner side of the wheel felly and including an outer axially extending flange provided with a circular series of openings, and an inner radial flange flatly engages the felly and provided with axially extending guide pins, a plurality of arcuate shoes arranged in end to end relation adjacent to and inwardly of the axially extending flange of the ring, and provided with end radial slots of elongate form through which said guide pins project for permitting radial movement of the shoes and guiding the same in such movement, radial spurs projecting outwardly through the openings in the axially extending flange of the ring and having their inner ends attached to said shoes and supporting and operating means for the shoes manually operable for retracting the spurs inwardly beyond the tread of the vehicle tire or outwardly beyond the latter at will.

2. A traction attachment for vehicle wheels including a ring of angular cross section adapted to be rigidly secured against the inner side of the wheel felly and including an outer axially extending flange provided with a circular series of openings, an inner radial flange flatly engaging the felly and provided with axially extending guide pins, a plurality of arcuate shoes arranged in end to end relation adjacent to and inwardly of the axially extending flange of the ring and provided with end radial slots of elongated form through which said guide pins project for permitting radial movement of the shoes and guiding the same in such movement, radial spurs projecting outwardly through the openings in the axially extending flange of the ring and having their inner ends attached to said shoes and supporting and operating means for the shoes manually operable for retracting the spurs inwardly beyond the tread of the vehicle tire or outwardly beyond the latter at will, each of said shoes comprising a pair of arcuate plates connected in side by side spaced parallel relation and having the inner ends of the spurs disposed therebetween, a plurality of spurs being associated with each shoe, and the means for connecting the plates of each shoe together comprising means for pivotally connecting the inner ends of the spurs therethrough.

In testimony whereof I affix my signature.

ALPHONSUS L. McCAULEY.